Figure 1:
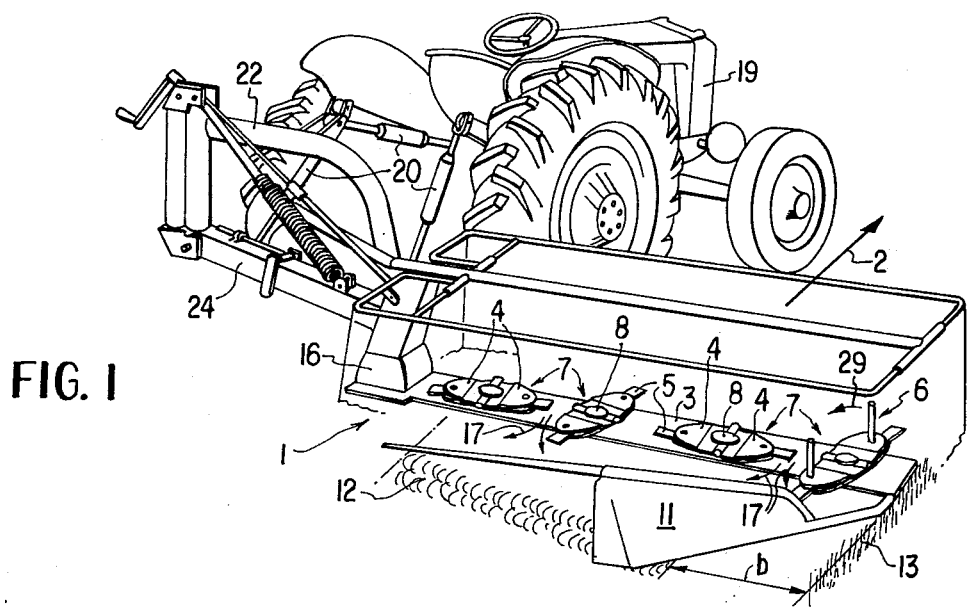

United States Patent [19]

Oosterling et al.

[11] 4,050,224
[45] Sept. 27, 1977

[54] MOWING IMPLEMENT

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 597,780

[22] Filed: July 21, 1975

[30] Foreign Application Priority Data

July 22, 1974 Netherlands .................... 7409898

[51] Int. Cl.$^2$ .................................... A01D 55/18
[52] U.S. Cl. ........................... 56/295; 56/192; 56/13.5
[58] Field of Search .............. 56/295, 255, 12.7, 16.7, 56/17.5, 192, 17.1, 13.5

[56] References Cited

U.S. PATENT DOCUMENTS

| | | | |
|---|---|---|---|
| 969,817 | 9/1910 | Weathern | 56/295 |
| 3,086,346 | 4/1963 | Zimmernann | 56/17.1 |
| 3,507,102 | 4/1970 | Kline et al. | 56/12.3 |
| 3,507,104 | 4/1970 | Kline et al. | 56/295 |
| 3,555,798 | 1/1971 | Eder | 56/295 |

*Primary Examiner*—Russell R. Kinsey
*Attorney, Agent, or Firm*—Snyder, Brown & Ramik

[57] ABSTRACT

In a mowing implement, wherein mowing members are rotatably journalled above a housing accommodating a driving gear, stones may be jammed between the mowing members and the housing.

Damage of the mowing implement through stones is avoided in that each mowing member mainly comprises two cutter supports adapted to turn upwardly with respect to the driving member each about a horizontal axis, which is located near the upright rotary axis of the associated driving member.

16 Claims, 5 Drawing Figures

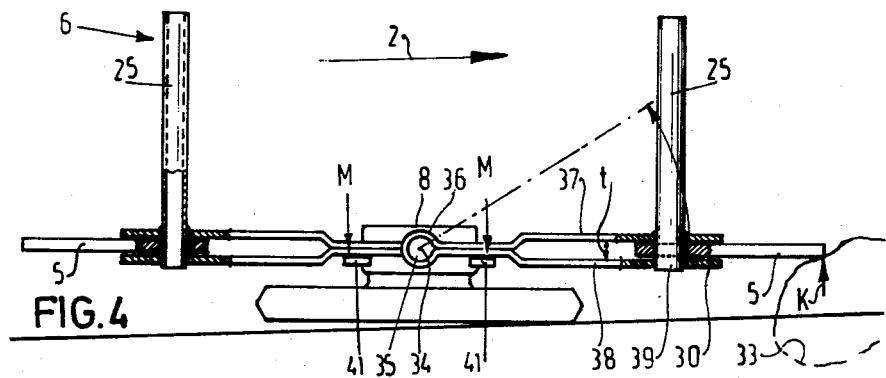
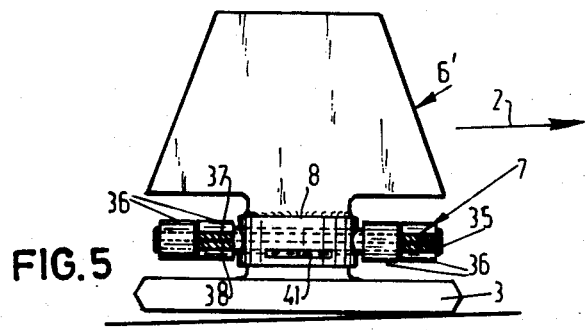

MOWING IMPLEMENT

The invention relates to a mowing implement comprising a housing extending transversely of the direction of movement of the implement, a plurality of mowing members rotatably journalled on said housing and a driving gear accommodated in said housing and driving the mowing members, each mowing member comprising at least one cutter support driven by a driving member of the driving gear adapted to rotate about an upright axis and at least one cutter secured to a fastening portion of the cutter support.

Such a mowing implement is known. On the bottom side of each mowing member constructed in the form of a disc there is provided a screen fastened to the front side of the housing in order to avoid jamming of stones between the disc and the housing and consequent damage of the mowing implement. With this known mowing implement the moving cutter can nevertheless touch a hard object, for example, a stone outside the screen, said object then exerting a reactive force on the cutter, a vertical component of which tends to lift a large part of the mowing implement via the cutter and the fastening portion of the mowing member. This may result in serious damage of the mowing implement.

The invention has for its object to provide a simple mowing implement, which does not involve the risk of damage of the mowing implement.

The mowing implement of the kind set forth is improved in accordance with the invention by constructing each mowing member essentially by two cutter supports adapted to turn upwardly each about a horizontal axis, which is near the upright axis of the driving member concerned. If the cutter and/or the fastening portion strikes a hard object lying in or on the ground, the vertical component of the reactive force is capable of turning upwardly the cutter and the fastening portion out of the normal mowing position without producing excessive stress in any part of the mowing implement, since the housing of the mowing implement is not lifted at all by the vertical component of the reactive force.

If the width of the cutter supports in the direction of length of their horizontal pivotal axis approximately corresponds with the width of the housing the objects lying on the ground cannot engage parts of the mowing member located midway between the fastening portions.

In order to ensure an accurately determined mowing level the mowing implement according to the invention is preferably characterized by a stop limiting the downward movement of the fastening portion of the cutter support.

The fastening portion is preferably urged by centrifugal force into the normal mowing position.

The aforesaid and further features of the invention will be apparent from the following description of preferred embodiments of the mowing implement in accordance with the invention.

Figure 3:
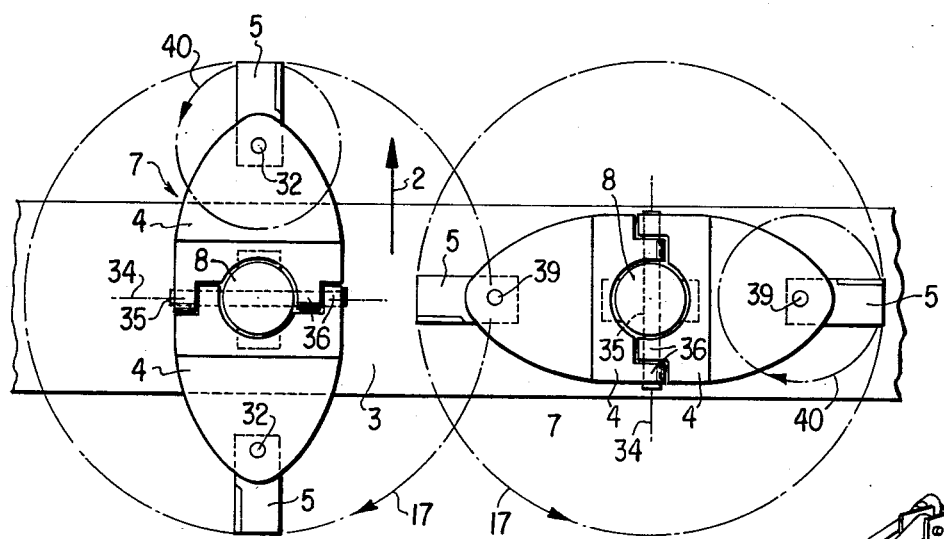
Figure 2:
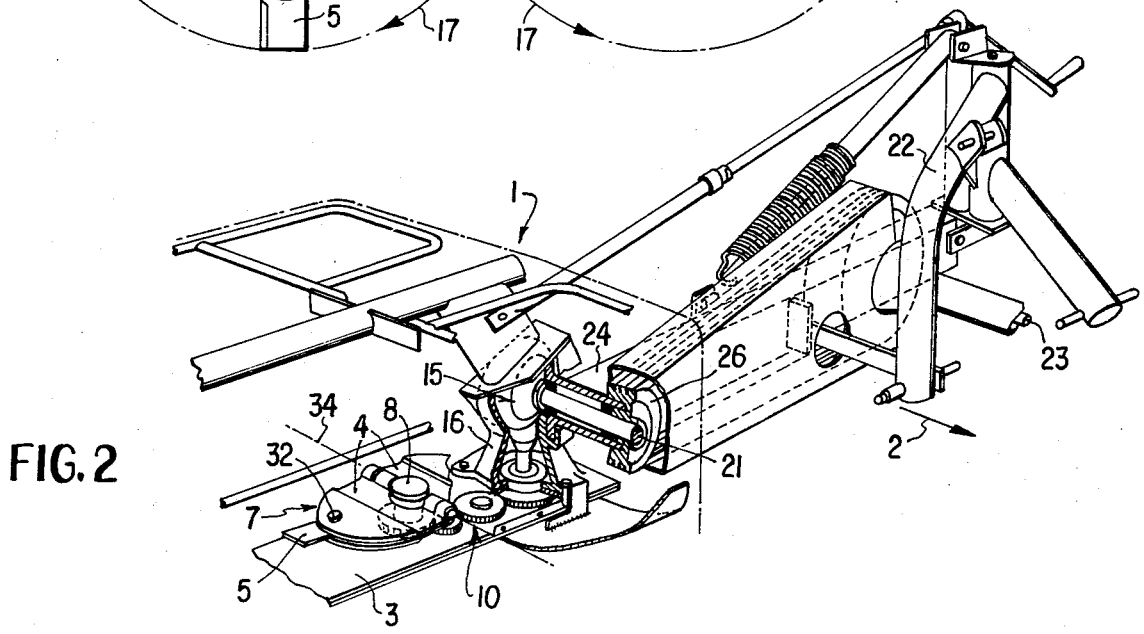

In the drawings:

FIG. 1 is a perspective rear view of a tractor having a preferred embodiment of a mowing implement embodying the invention, FIG. 2 is a partial perspective front view of said mowing implement on an enlarged scale, FIG. 3 is an enlarged plan view of a portion of the implement of FIG. 1, FIG. 4 is an enlarged sectional view of the implement of FIG. 1, portions being broken away, and FIG. 5 is a sectional view like FIG. 4 of a further embodiment of a mowing implement in accordance with the invention.

The mowing implement 1 shown in FIG. 1 is attached to a frame 22 suspended from the suspension bars 20 of a tractor 19, in which frame a driving shaft 23 is journalled, which is driven by the tractor 19. An auxiliary frame 24 is adapted to pivot about the horizontal driving shaft 23 with respect to the frame 22. The auxiliary frame 24 is pivoted to a casing 16 of a bevel driving means 15 so as to be able to turn about the input shaft 21 of said bevel gear drive 15. The shaft 21 is driven through a belt transmission means 26 by the driving shaft 23.

The mowing implement 1 according to the invention comprises a housing 3 extending transversely of the intended direction of movement 2 and having the shape of a flat, elongated beam. A plurality of mowing members 7 are rotatably journalled on the housing 3 by means of upright shafts 8. The mowing members 7 are arranged near and above the housing 3 and are adapted to rotate pairwise in opposite directions 17. Each mowing member 7 comprises two cutter supports 4, which are rigidly connected by means of a shaft 8 with a gear forming a driving member of a driving gear means constituted by a series of gears 10 and accommodated in the housing 3 and two cutters 5 arranged each on a fastening portion 30 of a cutter support 4. The gear 10 nearest the tractor 19 is driven by the bevel gear drive 15.

The mowing member 7 furthest remote from the tractor 19 is provided on its cutter support 4 with a crop separator 6 comprising two upright crop separating elements 25 formed by the upwardly prolonged fastening pins 39, said crop separating elements 25 describing upon fast rotation a substantially cylindrical path and displacing the cut crop in the direction of the arrow 29, after which during the forward movement of the mowing implement 1 a conventional swath board 11 mounted on the housing 3 and the crop separator 6 displaces the crop further inwardly so that behind the mowing implement 1 a swath 12 is deposited at a free distance $b$ from the uncut crop 13.

When a cutter 5 strikes a stone 33 in the ground, the latter exerts on the cutter 5 a reactive force having a vertical component K. In order to avoid the tendency to lift the mowing implement 1 and the attendant damage of the mowing implement 1 the fastening portion 30 of the cutter support 4 can be moved out of the normal mowing position indicated in FIG. 4 by solid lines mainly, at least in a first instance, in a vertical upward direction, since the cutter supports 4 are connected with the shaft 8 so as to be relatively pivotable about a horizontal, central axis 34. For this purpose a horizontal pivotal shaft 35 extends through the shaft 8 and each cutter support 4 has two ears 36 engaging on either side of the shaft 8 the common central pivotal shaft 35. The two cutter supports 4 are identical and are each formed by a punched, bent-over plate of spring steel so that an upper sheet 37 and a lower sheet 38 are formed, between which the cutter 5 is freely rotatable about the fastening pin 39 so that a horizontal component of a reactive force exerted by a stone 33 will move the cutter 5 in the direction of the arrow 40.

The fastening pin 39 is welded to the upper sheet 37 and the cutter 5 can be replaced by enlarging the relative vertical distance $t$ between the lower sheet 38 and the upper sheet 37 against their spring force so that the cutter 5 is released from a fastening pin 32, 39 engaging a hole of the lower sheet 38 and passed through a hole of the cutter 5.

The width of the cutter supports 4 in the longitudinal direction of their horizontal pivotal axis 35 approximately corresponds with the width of the housing 3 so that stones 33 midway between the fastening portions 30 cannot engage the cutter supports 4. The shaft 8 has stops 41 for limiting the downward movement of the fastening portions 30 of the cutter supports 4, which supports are urged into the normal mowing position by centrifugal force. The cutter support 4 engages in its normal mowing position a stop 41 with a predetermined minimum force M in order to determine the position of the cutter support 4 in normal mowing operation. This minimum force M is obtained by disposing the stop 41 at a level such that the cutter support 4 is firmly pressed against it by centrifugal force. The force of gravity of the cutter support contributes to the pressure on the stop 41. If desired the cutter support 4 may be urged against the stop 41 by spring force.

Referring to FIG. 5 a plate-shaped crop separator 6 is rigidly secured to the shaft 8 of the mowing member 7. The crop separator 6 is parallel to the horizontal shaft 35 and allows the cutter supports 4 to move upwardly to the required extent.

What we claim is:

1. A mowing implement comprising, in combination:
    an elongate housing adapted to be carried by a powered vehicle for movement over the ground surface with the housing extending transverse to the direction of movement effected by the powered vehicle;
    gear means disposed within said housing and including at least one drive gear disposed along the length of the housing, said drive gear having a vertical shaft connected thereto and projecting upwardly through said housing, said gear means imparting rotation to said shaft;
    horizontal pivot means attached to said shaft in closely overlying relation to said housing;
    a pair of cutter supports pivotally engaged by said pivot means, said cutter supports projecting radially from said shaft and each carrying a cutter member which sweeps a circular path which extends forwardly of said housing, and each cutter support being freely pivotal on said pivot means about a horizontal axis whereby each cutter support is free to deflect upwardly out of the plane of said circular path and away from the top of said housing during operation of the mowing implement.

2. A mowing implement as defined in claim 1 wherein each cutter support is identical to the other and each includes a base portion straddling said shaft and presenting ears on opposite sides thereof, said pivot means being in the form of a shaft passing through said ears.

3. A mowing implement as claimed in claim 1, wherein the width of the cutter supports in the longitudinal direction of their horizontal pivotal axes approximately corresponds with the width of the housing.

4. A mowing implement as claimed in claim 1 including a stop carried by said shaft for limiting the downward movement of the fastening portion of the cutter support.

5. A mowing implement as claimed in claim 1, wherein the fastening portion is urged into the normal mowing position by centrifugal force.

6. A mowing implement as claimed in claim 1, wherein said pair of cutter supports are identical.

7. A mowing implement as claimed in claim 1 wherein said pivot means provides a common, central, horizontal axis for both cutter supports.

8. A mowing implement as claimed in claim 1, wherein each cutter support is made from a spring steel sheet.

9. A mowing implement as claimed in claim 8, wherein each cutter support includes an upper sheet and a lower sheet and each cutter member is arranged between the upper sheet and the lower sheet of its associated cutter support.

10. A mowing implement as claimed in claim 9 including an upright pin extending between the upper sheet and the lower sheet of each cutter support and each cutter member is pivotally carried by an associated pin.

11. A mowing implement as claimed in claim 9, wherein each upper sheet and lower sheet of a cutter support are resilient whereby they may be spread apart for replacing each cutter.

12. A mowing implement as claimed in claim 3, wherein each cutter support in its normal mowing position engages said stop with a predetermined minimum force.

13. A mowing implement as claimed in claim 1, wherein a crop separator is arranged on said shaft and projects upwardly therefrom to allow said cutter supports to deflect upwardly.

14. A mowing implement as claimed in claim 1, wherein a crop separator is arranged on one of the cutter supports and is secured thereto.

15. A mowing implement as claimed in claim 1, wherein at least two separate crop separating elements are arranged on the cutter supports.

16. A mowing implement as claimed in claim 15, wherein two separate crop separating elements are arranged on the cutter supports, said crop separating elements are each in the form of a bar.

* * * * *